United States Patent [19]

Sickle et al.

[11] Patent Number: 5,105,114

[45] Date of Patent: Apr. 14, 1992

[54] FRAME AND MAGNET ASSEMBLY FOR A DYNAMOELECTRIC MACHINE

[75] Inventors: Richard A. V. Sickle; Xen L. Small, both of Anderson; Kenneth P. Heuer, Greenfield, all of Ind.

[73] Assignee: General Motors Corporation, Detroit, Mich.

[21] Appl. No.: 702,878

[22] Filed: May 20, 1991

[51] Int. Cl.⁵ ............................................. H02K 23/04
[52] U.S. Cl. ................................... 310/154; 310/42; 310/89; 310/91; 310/258
[58] Field of Search ................... 310/154, 156, 88, 89, 310/91, 42, 258

[56] References Cited

U.S. PATENT DOCUMENTS

| | | | |
|---|---|---|---|
| 3,772,546 | 11/1972 | Means | 310/154 |
| 3,789,250 | 1/1974 | Macoit et al. | 310/154 |
| 3,790,830 | 2/1974 | Bonfiglio | 310/154 |
| 4,587,449 | 5/1986 | West | 310/154 |
| 4,769,624 | 9/1988 | Merritt et al. | 310/154 |

FOREIGN PATENT DOCUMENTS

| | | |
|---|---|---|
| 2068244 | 8/1971 | France. |
| 0155567 | 12/1980 | Japan. |
| 0056158 | 5/1981 | Japan. |
| 0122659 | 7/1982 | Japan. |

OTHER PUBLICATIONS

Research Disclosure; Sep. 1988, "Retainer for a Permanent Pole and Secondary Pole".

*Primary Examiner*—R. Skudy
*Attorney, Agent, or Firm*—Creighton R. Meland

[57] ABSTRACT

A frame and magnet assembly for a dynamoelectric machine. The assembly includes an imperforate frame member that is formed of metallic magnetic material. A one-piece tubular imperforate magnet supporting part formed of nonmagnetic stainless steel is disposed within the frame. The magnet supporting part has a plurality of circumferentially spaced open-ended pockets and a permanent magnet is located in each pocket. The magnet supporting part has circular rims located at opposite ends of the supporting part. These rims are welded to the frame by circular imperforate continuous weld joints that extend throughout the entire circumference of the rims. These weld joints provide a hermetic seal that will not allow the entry of foreign substances, such as salt spray, into contact with the permanent magnets.

4 Claims, 2 Drawing Sheets

FRAME AND MAGNET ASSEMBLY FOR A DYNAMOELECTRIC MACHINE

This invention relates to a frame and permanent magnet assembly for a dynamoelectric machine.

Dynamoelectric machines that have a frame formed of magnetic material, such as steel, that carries permanent magnets are well known, one example of this being disclosed in the U.S. Pat. No. 4,769,624 to Merritt et al. In that patent, the individual permanent magnets are each encapsulated in a metallic housing. The housing for each magnet is formed of two metallic parts that are seam welded together, the seam welds being continuous and providing an impervious hermetic seal that will not allow the entry of moisture or the like into contact with a permanent magnet. Therefore, corrosion of the permanent magnets from contact with corrosive substances, such as salt spray, is prevented.

The permanent magnet supporting and encapsulation method shown in the above referenced Merritt et al. patent will prevent corrosion of the permanent magnets. However, since each magnet is enclosed in its own individual housing, a number of individual pockets or units must be provided if the field assembly for an electric motor is to have a plurality of permanent magnets. For example if the field assembly is to have four permanent magnets, four separate permanent magnet assemblies must be manufactured and the four assemblies must then be individually welded to a frame. In the manufacture of each individual assembly the metallic part that accommodates the permanent magnet has to be welded to a metallic back plate along four sides to provide a rectangular seam weld that will not allow the entry of corrosive substances into contact with the permanent magnet.

It accordingly is an object of this invention to provide a frame and permanent magnet assembly for a dynamoelectric machine that is capable of preventing corrosive substances from contacting the permanent magnets but which does not require that individual encapsulated permanent magnet assemblies be manufactured and subsequently welded to the frame. In carrying this object forward, a one-piece tubular imperforate part formed of a nonmagnetic material is provided which has a plurality of circumferentially spaced pockets for receiving the permanent magnets. These pockets can also receive a shunt or secondary pole that is formed of a magnetic material such as iron. The opposed ends of the tubular part each have a circular flange. The tubular part with magnets and shunts in the respective pockets is inserted into a frame with the outer surfaces of the opposed circular flanges engaging inner surfaces of the frame. Each flange is now seam welded to the frame. The seam welds are continuous and therefore provide a continuous welded joint that will not allow any corrosive substance, such as salt spray, to enter the interior of the tubular part. Consequently, no corrosive substances can contact the permanent magnets located in the pockets. In summary, by using a one-piece tubular part of the type described, only two circular seam welds are required to completely encapsulate the permanent magnets. Further, the requirement that individual encapsulated permanent magnet assemblies be manufactured and later individually welded to a frame has been eliminated. In addition, it can be appreciated that the part count, as compared to the use of individual encapsulated permanent magnet assemblies, has been reduced by this invention.

Figure 1:
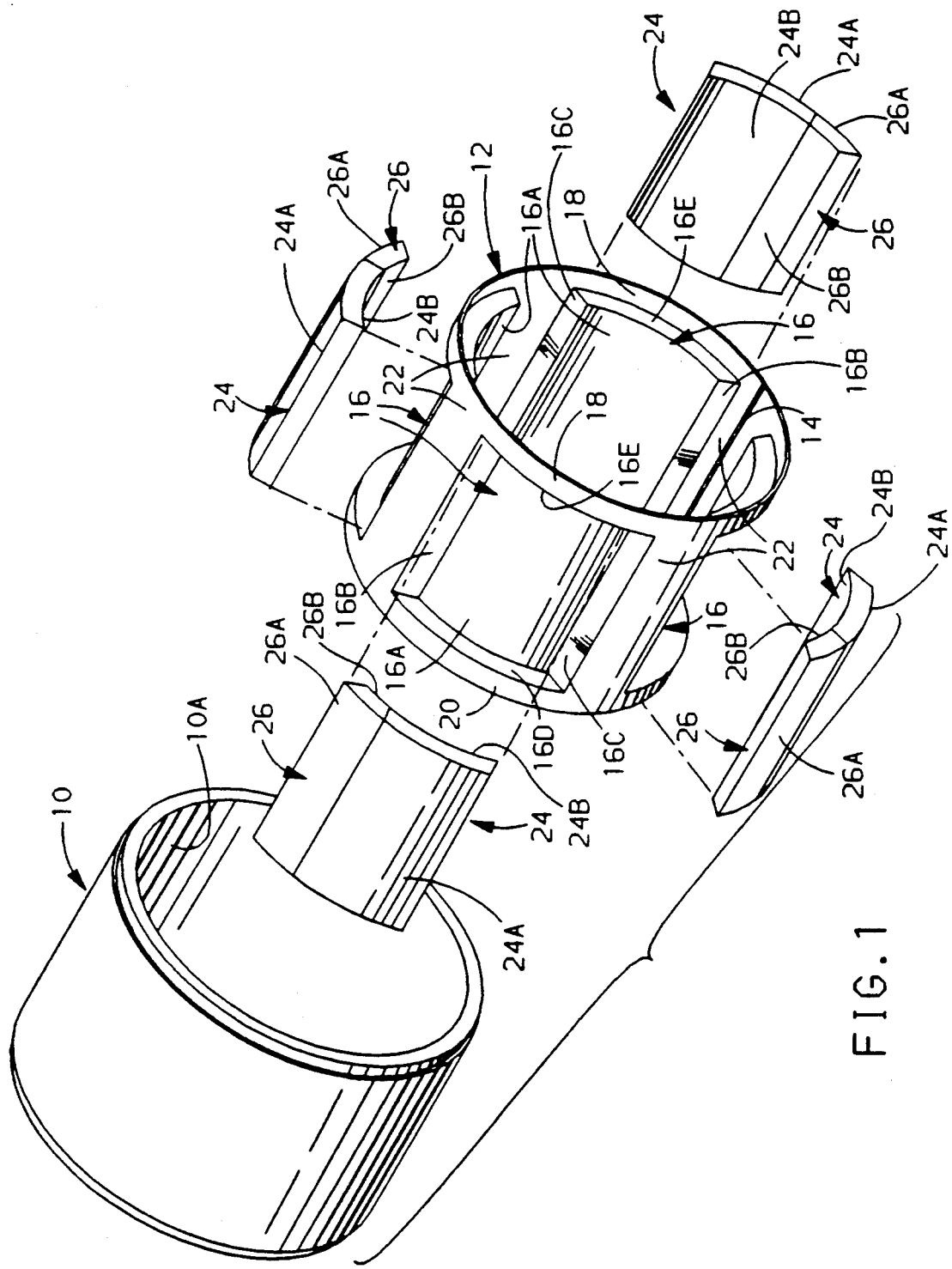
FIG. 1 is an exploded perspective view illustrating the parts that make up the frame and magnet assembly of this invention.

Referring now to the drawings and more particularly to FIG. 1, the reference numeral 10 designated a frame for a dynamoelectric machine. This frame is tubular and imperforate and is formed of a magnetic material such as steel. The frame may be part of an electric cranking motor for an electric engine starter. The frame 10 has an internal circular surface or wall 10A.

The frame and magnet assembly utilizes a one-piece tubular permanent magnet retainer or support generally designated as 12. This retainer or support part 12 is formed of an imperforate metallic nonmagnetic material. By way of example, part 12 can be formed of a nonmagnetic stainless steel, for example, AISI 302 stainless steel. The thickness of tubular part 12 may be about 0.005 inches. The part 12 has an axially extending seam weld 14 which is made when the part 12 is made. The seam weld 14 joins opposed edges of part 12 when the part is rolled up into its tubular shape. The seam weld 14 is continuous and imperforate and extends the entire length of part 12.

The part 12 has four circumferentially spaced pockets or recesses each generally designated as 16. Since these pockets are identical, only one of the pockets 16 will be described in detail. Each pocket 16 is defined by an inner arcuately extending wall 16A and four generally radially extending walls 16B, 16C, 16D and 16E. As will be described, the pockets 16 are shaped to receive a permanent magnet and a shunt member. The part 12 has opposed circular flanges or rims 18 and 20 located respectively at opposite ends of part 12. The portions of part 12 that define the pockets 16 are joined by arcuately extending portions 22.

The frame and magnet assembly has four permanent magnets, each designated as 24 and four magnetic shunts each designated as 26. Permanent magnets 24 have opposed arcuate end surfaces or faces 24A and 24B and shunts 26 have opposed arcuate end surfaces or faces 26A and 26B. The arcuate surfaces of the permanent magnets and shunts are complementary to the shape of pocket walls 16A and the internal surface 10A of frame 10. The permanent magnets may be of the iron-neodymium-boron type which can corrode if subjected to a corrosive substance. The shunts 26 are formed of a magnetic material such as iron.

Figure 3:
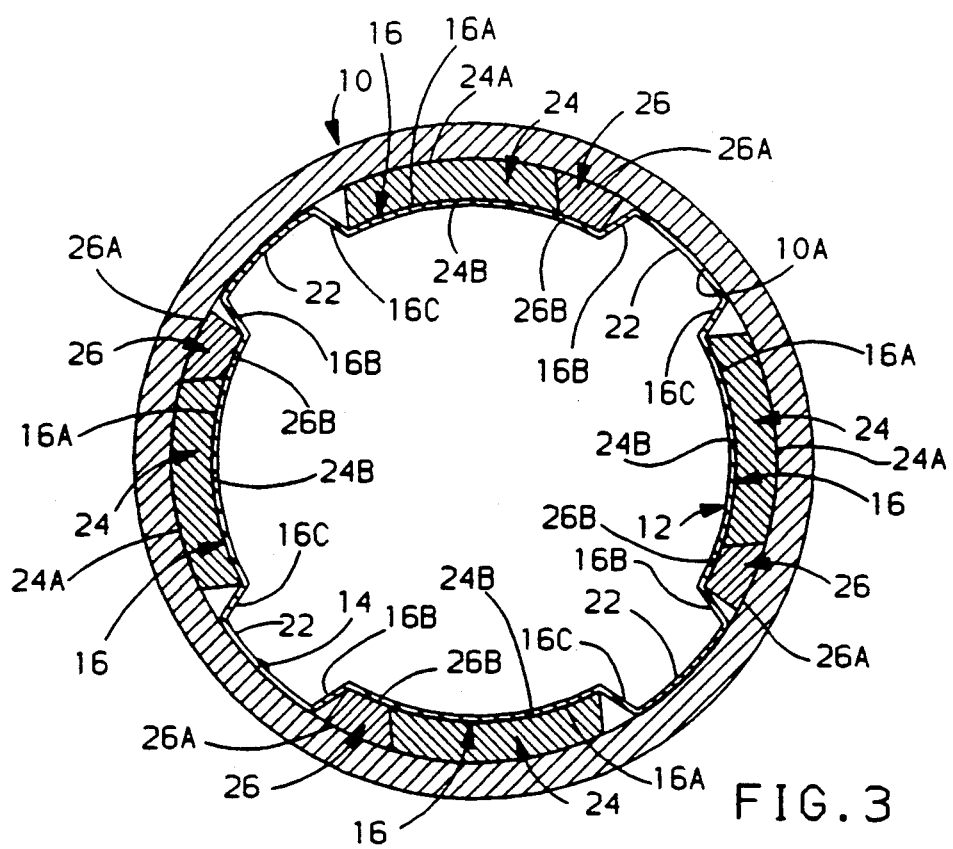
FIG. 3 is a sectional view taken along line 3—3 of FIG. 2.

In the assembly of the magnet and frame assembly, the permanent magnets 24 and the shunts 26 are inserted into the pockets 16 in side by side engaging relationship as shown in FIG. 3. The axial length of the permanent magnets 24 and shunts 26 is about the same length as the distance between pocket walls 16D and 16E.

Figure 2:
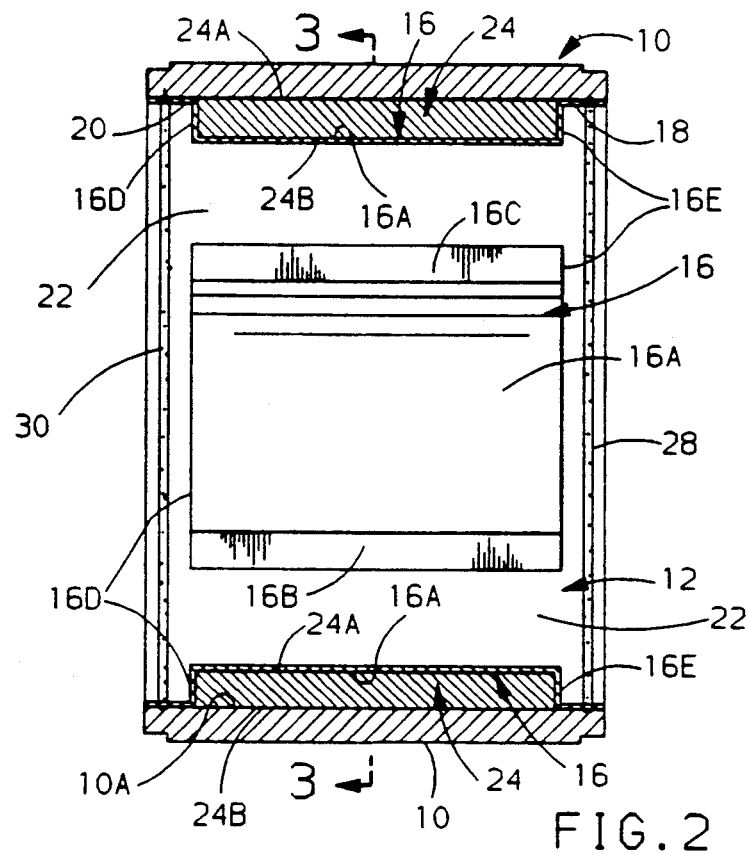
FIG. 2 is a sectional view of frame and magnet assembly made in accordance with this invention.

When the permanent magnets and shunts have been inserted into the pockets, they are held in place by a suitable magnetic fixture. The frame 10 is now slid over the part 12 and over the magnets and shunts in the pockets. In the final position of part 12, the outer surfaces of flanges 18 and 20 engage inner circular surface portions of inner surface 10A of frame 10 as shown in FIG. 2. Further, portions 22 of part 12 engage surface portions of surface 10A of frame 10.

With part 12 in its proper position as shown in FIG. 2, flanges 18 and 20 are seam welded to circular inner surface portions of the inner surface 10A of frame 10. The seam welds are shown in FIG. 2 and designated respectively as 28 and 30. The welds 28 and 30 extend continuously for 360 degrees, in other words, along the entire circumferential length of respective flanges 18 and 20. The seam welds 28 and 30 form continuous joints or welds that provide an impervious hermetic seal at each end of part 12. Thus, the same welds 28 and 30 will not permit corrosive substances, such as salt spray, to enter the part 12 and accordingly no corrosive substance can contact permanent magnets 24. The flanges 18 and 20 are the only portions of part 12 that are welded to frame 10. There is no need to weld portions 22 to frame 10 since once the seam welds 28 and 30 have been made, the permanent magnets are totally hermetically encapsulated or enclosed by frame 10, seam welds 28 and 30 and part 12.

The part 12 may be manufactured by providing a flat strip of stainless steel and then forming the pockets 16 in the strip. The strip is then rolled up into a tubular shape and then mating edges are joined by seam weld 14. The seam weld 14 must be imperforate and continuous so as to not allow passage of a foreign substance. It forms a hermetic seal.

Alternatively, the part 12 can be formed into a tubular part and then the pockets are formed in the tubular part. Thus, the part 12 can be formed as an extruded tube (no seam weld) and the pockets are then formed in the tube.

The frame and magnet assembly of this invention is intended to be used as a field assembly for providing magnetic flux to a direct voltage electric cranking motor. In such use, the armature of the motor rotates within part 12 and the frame 10 is secured to end frames of the cranking motor.

The permanent magnets 24 can be magnetized after part 12 has been welded to frame 10. This procedure eliminates the problem of magnetizing the magnets with the wrong polarity and also eliminates the problem of the frame picking up metallic particles prior to final assembly. After magnetization, the opposed end faces 24A and 24B of a magnet have opposite magnetic polarities.

It will be appreciated that this invention can be used in field assemblies that do not use a shunt such as the shunts 26. If shunts are not used, the pockets 16 are shaped to accommodate only permanent magnets.

The embodiments of the invention in which an exclusive property or privilege is claimed are defined as follows:

1. A frame and permanent magnet assembly for a dynamoelectric machine comprising, an axially extending tubular imperforate frame member formed of magnetic material having an inner circular surface, a one-piece tubular imperforate magnet supporting part formed of a nonmagnetic metallic material disposed within said frame, said magnet supporting part having a plurality of axially extending and circumferentially spaced pockets, said pockets having open ends that face said inner circular surface of said frame member, and a permanent magnet located in each pocket, said magnet supporting part having first and second circular axially spaced rims located at opposite sides of said magnet supporting part, said pockets located between said first and second axially spaced circular rims, said first axially spaced circular rim of said magnet supporting part being welded to a circular inner surface portion of said frame by a first imperforate continuous circular weld joint that extends throughout entire circumferential length of said first axially spaced circular rim, said second axially spaced circular rim of said magnet supporting part being welded to said circular inner surface portion of said frame by a second imperforate continuous circular weld joint that extends throughout the entire circumferential length of said second axially spaced circular rim, portions of said frame, said magnet supporting part and said first and second imperforate continuous circular weld joints providing an imperforate enclosure for said permanent magnets.

2. The frame and magnet assembly according to claim 1 where said magnet supporting part is formed of stainless steel.

3. The frame and magnet assembly according to claim 1 wherein said magnet supporting part is formed of stainless steel and where the said magnet supporting part has a thickness of about 0.005 inches.

4. The frame and magnet assembly according to claim 1 wherein a shunt member formed of magnetic material is located in each of said pockets in side by side relationship with said permanent magnet.

* * * * *